US012299129B2

United States Patent
Terpstra et al.

(10) Patent No.: US 12,299,129 B2
(45) Date of Patent: May 13, 2025

(54) CLUSTERED VIRTUAL TRUSTED PLATFORM MODULE DOMAIN SERVICES WITH A REDIRECTOR/ROUTER SERVICE SYSTEM

(71) Applicant: Dell Products L.P., Round Rock, TX (US)

(72) Inventors: John Henry Terpstra, Austin, TX (US); Jeroen Mackenbach, Roosendaal (NL); Anantha K Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 315 days.

(21) Appl. No.: 17/729,094

(22) Filed: Apr. 26, 2022

(65) Prior Publication Data

US 2023/0342469 A1  Oct. 26, 2023

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC ............................ G06F 21/57; G06F 2221/034
USPC .......................................................... 726/1
See application file for complete search history.

(56) References Cited

U.S. PATENT DOCUMENTS

| | | | | |
|---|---|---|---|---|
| 9,047,468 B2 * | 6/2015 | Sakthikumar | ........... | H04L 41/28 |
| 9,490,984 B2 * | 11/2016 | Leicher | ................. | H04L 63/062 |
| 9,690,622 B1 * | 6/2017 | Argenti | ................. | G06F 9/5027 |
| 9,846,640 B2 | 12/2017 | Boyapalle et al. | | |
| 11,201,785 B1 | 12/2021 | Kanevsky et al. | | |
| 11,442,767 B2 * | 9/2022 | Elliott | ................. | G06F 13/4282 |
| 2006/0143703 A1 * | 6/2006 | Hopen | .................... | H04L 67/63 |
| | | | | 726/15 |
| 2007/0079120 A1 * | 4/2007 | Bade | ....................... | G06F 21/57 |
| | | | | 713/166 |
| 2007/0300069 A1 * | 12/2007 | Rozas | ..................... | G06F 21/57 |
| | | | | 713/176 |
| 2009/0055641 A1 * | 2/2009 | Smith | ................. | G06F 9/45558 |
| | | | | 713/100 |

(Continued)

OTHER PUBLICATIONS

Chris I Dalton; Trusted Virtual Platforms: A Key Enabler for Converged Client Devices; ASM; year:20009; pp. 36-43.*

*Primary Examiner* — Monjur Rahim
(74) *Attorney, Agent, or Firm* — Larson Newman, LLP (57) ABSTRACT

An information handling system may validate a connection request received from a trusted platform module (TPM)-virtual (vTPM) module according to a policy, wherein the connection request originated from a virtual machine associated with the TPM-vTPM module which consumes services from a clustered vTPM domain service. In response to determining that the connection request is valid based on the policy, the system may determine the vTPM domain service associated to the TPM-vTPM module, and determine whether to route or redirect the connection request according to policy. In response to determining that the connection request is to be redirected, the system may transmit a response to the TPM-vTPM module, wherein the response includes redirect information to the vTPM domain service. In response to determining that the connection request is to be routed, the system may route the connection request to the vTPM domain service.

19 Claims, 5 Drawing Sheets

(56) References Cited

U.S. PATENT DOCUMENTS

| | | | | |
|---|---|---|---|---|
| 2009/0133097 | A1* | 5/2009 | Smith | G06F 21/53 |
| | | | | 726/1 |
| 2009/0165117 | A1* | 6/2009 | Brutch | G06F 21/57 |
| | | | | 726/14 |
| 2009/0169020 | A1* | 7/2009 | Sakthikumar | H04L 63/061 |
| | | | | 380/278 |
| 2011/0154443 | A1* | 6/2011 | Thakur | G06F 21/41 |
| | | | | 726/3 |
| 2011/0314472 | A1* | 12/2011 | Smith | G06F 9/45558 |
| | | | | 718/1 |
| 2012/0151209 | A1* | 6/2012 | Visnyak | H04L 63/105 |
| | | | | 713/166 |
| 2012/0203825 | A1* | 8/2012 | Choudhary | H04L 65/611 |
| | | | | 709/203 |
| 2015/0318986 | A1* | 11/2015 | Novak | H04L 9/0894 |
| | | | | 713/189 |
| 2015/0365436 | A1* | 12/2015 | Shenefiel | H04L 63/123 |
| | | | | 726/1 |
| 2016/0080474 | A1* | 3/2016 | Argenti | G06F 9/5072 |
| | | | | 709/201 |
| 2016/0112346 | A1* | 4/2016 | Nahrgang | H04L 61/4511 |
| | | | | 709/226 |
| 2017/0041398 | A1* | 2/2017 | Kumar | G06F 9/54 |
| 2018/0234326 | A1 | 8/2018 | Swierk et al. | |
| 2019/0042302 | A1* | 2/2019 | Goeringer | G06F 9/4875 |
| 2019/0392117 | A1* | 12/2019 | Viswanathan | G06F 21/121 |
| 2021/0406345 | A1* | 12/2021 | Sethi | H04L 9/083 |
| 2022/0035909 | A1 | 2/2022 | Boyapalle et al. | |
| 2023/0014894 | A1* | 1/2023 | M M | H04L 9/30 |

* cited by examiner

CLUSTERED VIRTUAL TRUSTED PLATFORM MODULE DOMAIN SERVICES WITH A REDIRECTOR/ROUTER SERVICE SYSTEM

FIELD OF THE DISCLOSURE

The present disclosure generally relates to information handling systems, and more particularly relates to an aid to use of clustered virtual trusted platform module domain services with a redirector/router service system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may validate a connection request received from a TPM-vTPM module according to a policy, wherein the connection request originated from a virtual machine associated with the TPM-vTPM module. In response to determining that the connection request is valid based on the policy, the system may determine a virtual trusted platform module domain service associated with the virtual machine, and determine whether the connection request includes a first request to redirect the connection request or a second request to route the connection request. In response to determining that the connection request includes the first request to redirect the connection request, the system may transmit a response to the TPM-vTPM module, wherein the response includes redirect information to the virtual trusted platform module domain service. In response to determining that the connection request includes the second request to route the connection request, the system may route the connection request to the virtual trusted platform module domain service.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
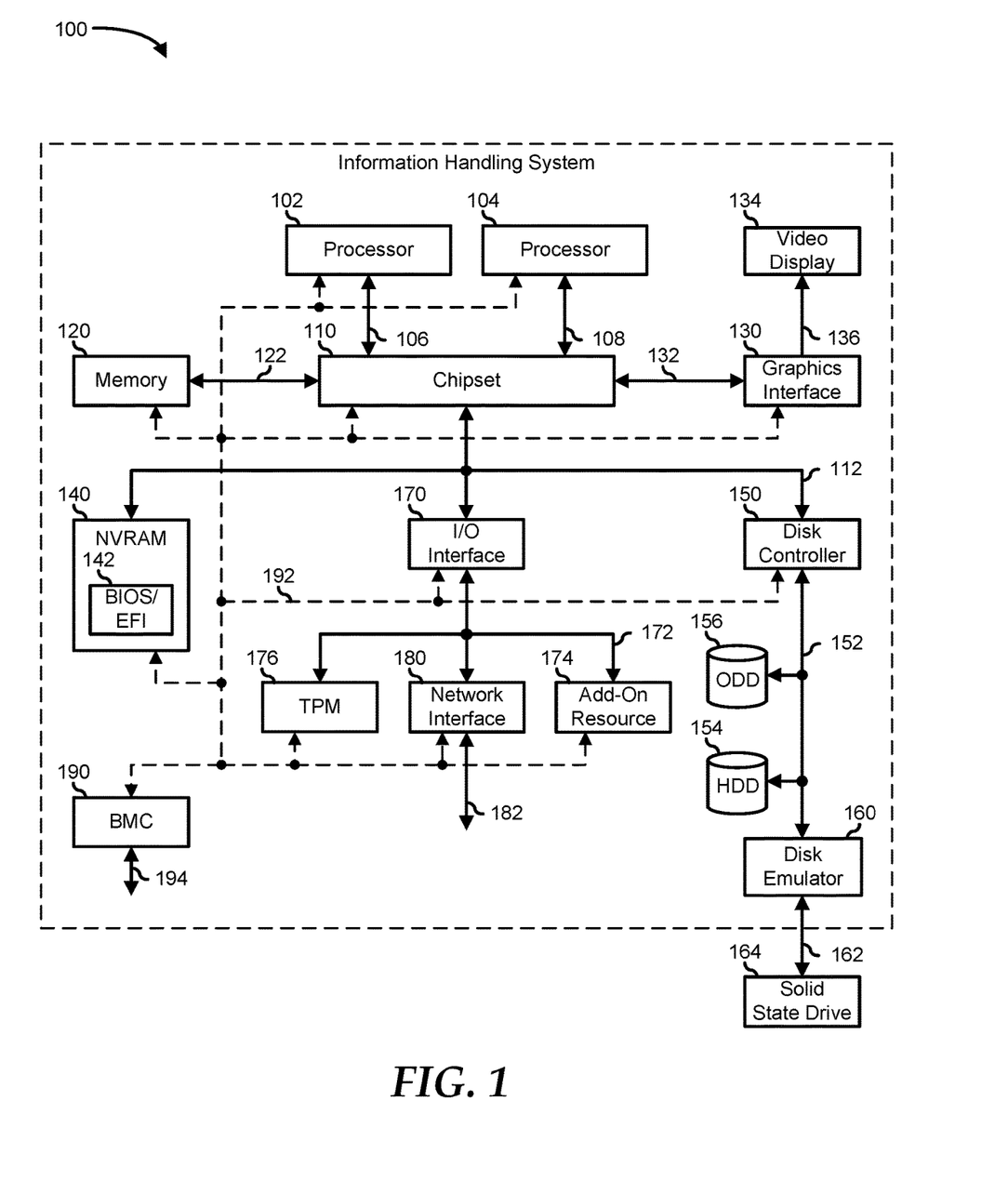
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, and non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, provide drivers for the resources, initialize the resources, and provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to a disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, and a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to the NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill in the art will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Information handling systems that are located at the edge of computing systems could be used to interfere with or compromise the safety of the entire computing system. For example, a user can plug a malicious device into one of its ports. Thus, it is desirable to implement a secure infrastructure that meets zero trust technology in these information handling systems. One way to provide this ability is to incorporate a TPM, such as TPM 176, within the information handling system and use it to perform trusted computing operations. The TPM is a microcontroller or chip developed by the Trusted Computing Group (TCG) that may store and manage secured data such as cryptographic keys. For example, the TPM may store data indicating the configuration of the information handling system. In some cases, configuration data may be used by the TPM to prevent different information handling systems or devices from accessing keys stored by the TPM. Loss of cryptographic keys on a TPM may result in an inability to access data, operations, applications, or the like on an information handling system.

A virtual machine with TPM support may be migrated to another server or hypervisor. However, migration of the virtual machine poses a problem because the platform configuration is typically tied to a specific instance of the TPM that is either physically or logically bound to the virtual machine. In addition, the TPM can be bound to a physical TPM (pTPM) or virtual TPM (vTPM) that in present technologies resides in the server that provides the hypervisor for the virtual machine. Thus, a virtual machine that is bound to a TPM, either physical or virtual, cannot be migrated to another server without loss of the TPM integrity. To address these and other issues, the present disclosure provides a system and method for network-accessible clustered vTPM domain services such that a secured TPM-dependent virtual machine can be migrated to another server or hypervisor without losing its TPM integrity.

In addition, with large organizations and corporations, there is a need to support a plurality of virtual machines that may be in different groups or clusters. Each group may be supported by a different clustered vTPM domain services as disclosed herein. As virtual machines migrate and TPM nodes in vTPM domain services fail or retire, creating and maintaining a mapping for each virtual machine—vTPM domain services administration and usage would be burdensome. To address additional issues associated with having a plurality of vTPM domain services supporting a large set of virtual machines, a policy-driven vTPM redirector/router service that manages and/or maintains the mapping and provides automatic redirection and routing support is further disclosed herein.

Figure 2:
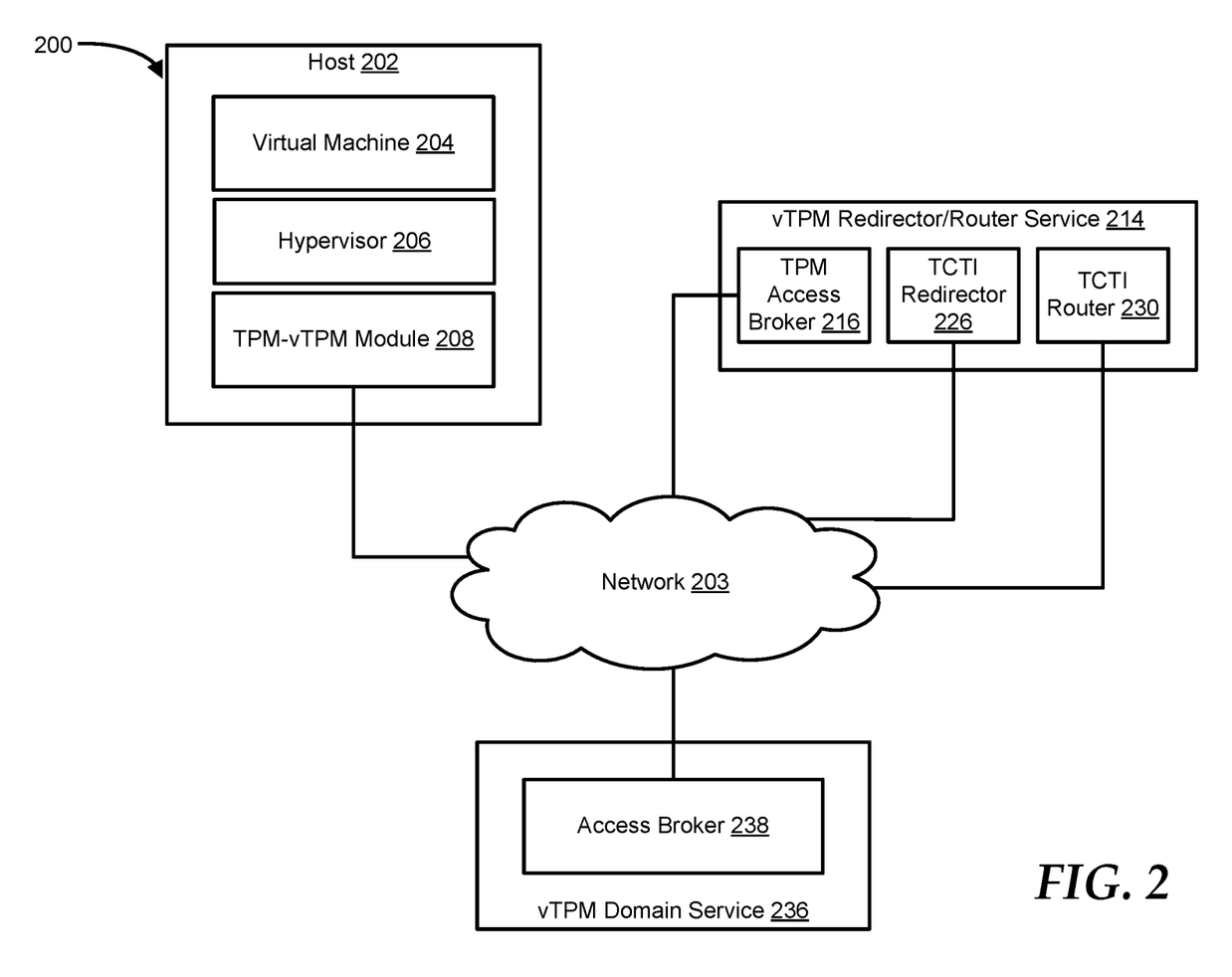
FIG. 2 is a block diagram illustrating an example system of a clustered virtual trusted platform module (vTPM) domain service with a redirector/router service, according to an embodiment of the present disclosure.

FIG. 2 illustrates a system 200, which can also be referred to as an environment, for clustered vTPM domain services. System 200 includes a host 202, a network 203, a vTPM redirector/router service 214, and a vTPM domain service 236. Host 202 includes a virtual machine 204, a hypervisor 206, and a TPM-vTPM module 208, also referred to as a TPM-vTPM consumer. As used herein, TPM may be interchangeable with pTPM. The vTPM redirector/router service 214 includes a TPM access broker (TAB) 216, a TCTI redirector 226, and a TCTI router 230. The vTPM domain service 236 includes an access broker 238. Each of these components can be implemented with hardware and/or software. The components shown are not drawn to scale and system 200 may include additional or fewer components. For example, there may be additional hosts and vTPM domain services. In addition, connections between components may be omitted for descriptive clarity.

Host 202 may be a physical device or information handling system that configured to host virtual machine 204 via hypervisor 206. Virtual machine 204 may be associated with TPM-vTPM module 208 which allows TPM to vTPM interaction. For example, TPM-vTPM module 208 may be configured to connect to and consume TPM functionality, such as key generation, secure authorization, and device-health attestation that are provided by vTPM domain service 236 via vTPM redirector/router service 214. When vTPM redirector/router service 214 receives the connection request, it may first validate the request according to a policy. The vTPM redirector/router service 214 may also determine the vTPM domain service associated with TPM-vTPM module 208, such that TPM-vTPM module 208 is authorized to consume the APIs published by vTPM domain service 236. In addition, vTPM redirector/router service 214 may also determine, based on the same or another policy, whether to redirect or route the received connection request.

If the connection request is to be redirected, then vTPM redirector/router service 214 via TCTI redirector 226 sends a response to TPM-vTPM module 208 that the connection request is to be redirected. The response may include information for redirecting the connection request to access broker 238 of vTPM domain service 236. This removes vTPM redirector/router service 214 outside the path of control of the connection request as the TPM-vTPM module 208 directly sends a connection request to vTPM domain service based on the redirection information received. Accordingly, the connection request is independent of control from vTPM redirector/router service 214. As such, the initial connection request to vTPM redirector/router service 214 may be terminated.

If the connection request is to be routed, vTPM redirector/router service 214 may route the request to access broker 238 of vTPM domain service 236 via TCTI router 230. When acting as a router for the connection request, the policy-driven vTPM redirector/router service 214 may maintain control, according to policy, over the interaction between the TPM-vTPM module 208 and/or virtual machine 204 where the request originated from. For example, vTPM redirector/router service 214 may monitor the status of the connection request and maintain policy control over the communication stream to vTPM domain service 236. If an event occurs while the communication stream to the vTPM domain service 236 is active, a control signal for the TPM-vTPM module may be injected in the communication stream. For example, if a policy that provides control over the communication stream expires, vTPM redirector/router service 214 may inject a control signal in the communication stream to TPM-vTPM module 208. An action may be initiated based on the control signal. For example, TPM-vTPM module 208 may terminate the connection request. In another example, an action that may intervene in the lifecycle of virtual machine in a manner anologous to a loss or failure of a pTPM may be performed, such as suspension of encryption or a security program that relies on the pTPM. The policies used to control or monitor the communication stream may be managed by a user or an administrator of vTPM redirector/router service 214.

Hypervisor 206 may include software and/or firmware generally operable to allow multiple virtual machines and/or operating systems to run on a single computing system such as host 202 at the same time. This operability is generally allowed via virtualization, a technique for hiding the physical characteristics of computing system resources, such as the physical hardware of the computing system from how other system applications or end-users interact with those resources. Hypervisor 206 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP.

Network 203 may be used by each component of system 200 for communicating with the other components, such as between host 202 and vTPM domain services 236. Network 203 may be implemented as or maybe as a part of, a storage area network (SAN), a personal area network (PAN), a local area network (LAN), a metropolitan area network (MAN), a wide area network (WAN), a wireless LAN (WLAN), a virtual private network (VPN), an intranet, the Internet, or any other appropriate architecture or system that facilitates the communication of signals, data and/or messages. The network may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof.

Figure 3:
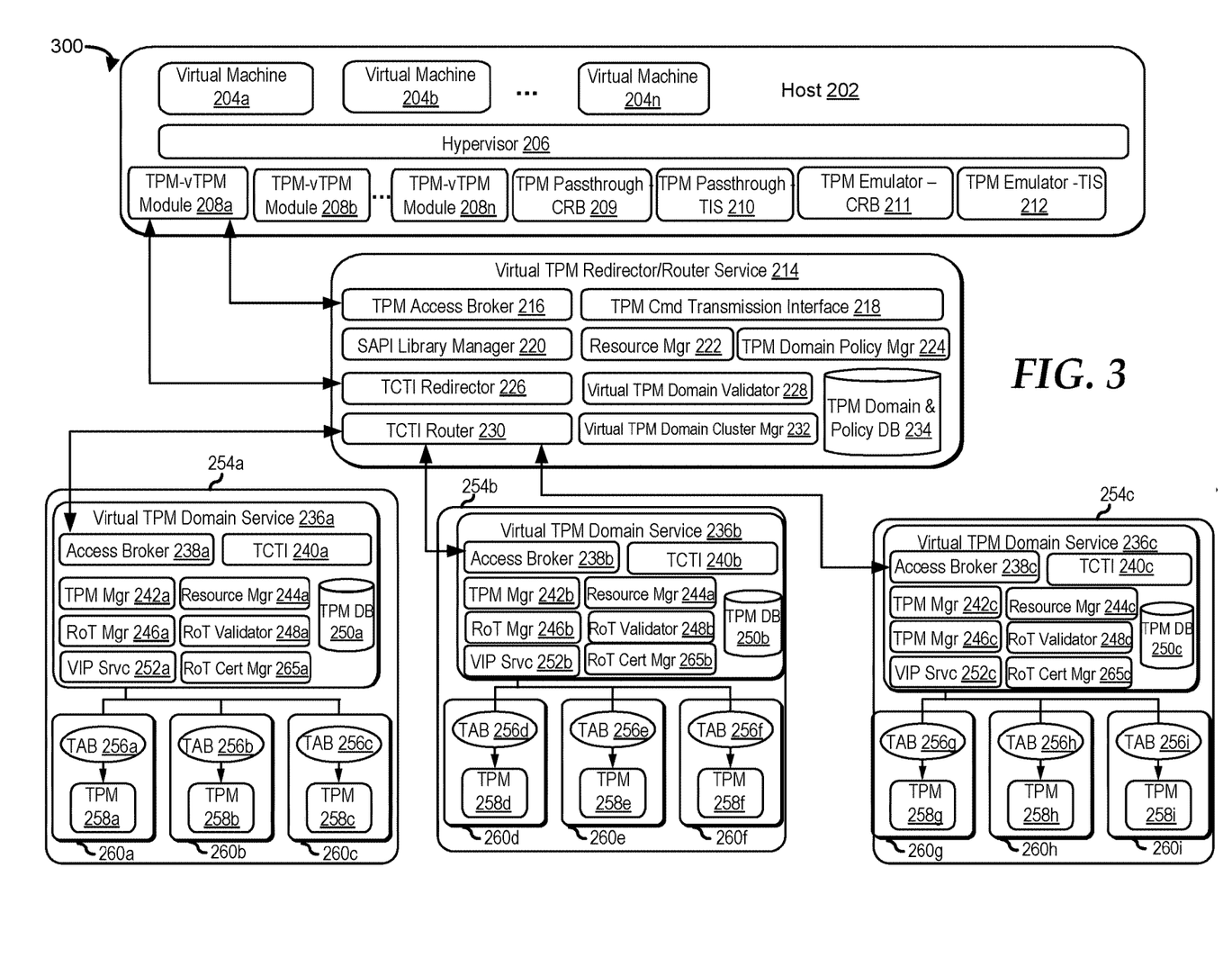
FIG. 3 is a block diagram illustrating an example system of a clustered vTPM domain service with a redirector/router service, according to an embodiment of the present disclosure.

FIG. 3 shows system 300 for clustered vTPM domain services. System 300 is a representation of system 200 in more detail. System 300 includes host 202 and vTPM domain service 236 hosted in clustered TPM security domains 254a-254c. Host 202 includes virtual machines 204a-204n, a hypervisor 206, TPM-vTPM modules 208a-208n, a TPM pass-through-command response buffer (CRB) 209, a TPM pass-through-TPM interface specification (TIS) 210, a TPM emulator-CRB 211, and a TPM emulator-TIS 212. vTPM redirector/router service 214 includes a TAB 216, a TPM command transmission interface (TCTI) 218, a system-level API (SAPI) library manager 220, a resource manager 222, a TPM domain policy manager 224, a TCTI redirector 226, a vTPM domain validator 228, a TCTI router 230, a vTPM domain cluster manager 232, and a TPM domain and policy database (DB) 234.

TPM security domains 254a-254c include node endpoints or servers referred to herein as TPM nodes, which may or may not be geographically co-located. For example, TPM security domain 254a includes TPM nodes 260a-260c. Each of the TPM nodes 260a-260c includes a TPM, which is a TPM chip, and a TPM access broker (TAB). As such, the TPM nodes may also be referred to herein as TPM hosts. For example, TPM node 260a includes a TAB 256a and a TPM 258a. TPM node 260b includes a TAB 256b and TPM 258b. TPM node 260c includes a TAB 256c and TPM 258c. TPM security domain 254b includes TPM nodes 260d-260f. TPM node 260d includes a TAB 256d and a TPM 258d. TPM node 260e includes a TAB 256e and a TPM 258e. TPM node 260f includes a TAB 256f and a TPM 258f. TPM security domain 254c includes TPM nodes 260g-260i. TPM node 260g includes a TAB 256g and a TPM 258g. TPM node 260h includes a TAB 256h and a TPM 258h. TPM node 260i includes a TAB 256i and a TPM 258i.

The vTPM domain service 236a includes an access broker 238a, a TCTI 240a, a TPM manager 242a, a resource manager 244a, a RoT manager 246a, a RoT, a TPM DB 250a, a virtual IP (VIP) service 252a, and a RoT certification manager 265a. The vTPM domain service 236b includes an access broker 238b, a TCTI 240b, a TPM manager 242b, a resource manager 244b, a RoT manager 246b, a RoT validator 248b, a DB 250b, a VIP service 252b, and a RoT certification manager 265b. The vTPM domain service 236c includes an access broker 238c, a TCTI 240c, a TPM manager 242c, a resource manager 244c, a RoT manager 246c, a RoT validator 248c, a DB 250c, a VIP service 252c, and a RoT certification manager 265c.

Host 202 may be configured to host virtual machines 240a-204n by employing or instantiating hypervisor 206. For example, host 202 may be a kernel-based virtual machine (KVM) node with a machine emulator such as QEMU. Virtual machines 204a-204n, which are also referred to herein as TPM clients, are emulations of computer systems that are based on computer architectures, and that provide the functionality of physical computer systems. The virtual machines may be deployed on the server when they are needed, migrated from one server to another server, or removed from the server which can result in a dynamic server environment in which virtual machines are deployed and removed regularly while utilizing different resources in that server.

Hypervisor 206 may be configured to support interaction with a physical TPM or a vTPM via an interface in either pass-through mode or an emulation mode. The pass-through mode requires exclusive access to the physical TPM. The pass-through drivers such as TPM pass-through-CRB 209 and TPM pass-through-TIS 210 are used for sending TPM commands and receiving responses to and from the physical TPM of host 202. This means the physical TPM is bound to that particular virtual machine and cannot be used by other virtual machines or host 202. During this mode, virtual machine migration is disabled. The emulation mode uses a vTPM for sending TPM commands and receiving responses. During this mode, a non-migratable file, which can be altered and its contents changed, that is handled locally by a local TAB is created. The vTPM may be accessed using TPM emulator-CRB 211 and TPM Emulator-TIS 212. TIS provides support for TIS version 1.x. CRB provides support for TIS version 2.x. As such, in both instances, the virtual machine cannot be migrated.

In order to migrate a virtual machine from one hypervisor to another hypervisor, there is a need for a vTPM service to provide a secure way of storing TPM emulated files in a secure storage device and attest that the storage device has not been tampered with. Accordingly, to address this and other issues, these functions may be provided by vTPM domain service 236 as disclosed herein. For example, vTPM domain service 236a may store vTPM instance files associated with virtual machines in TPM DB 250a. Also, vTPM domain service 236a can attest whether TPM DB 250a and its contents have not been tampered with by leveraging a clustered root of trust (RoT) anchored in TPMs 258a-258c. Also, because the vTPM domain service is hosted by clustered TPM nodes, if one of the TPM nodes fails, vTPM domain service 236a can keep running. In addition, because vTPM domain service 236a is running on top of a network service, the virtual machine can be migrated from one hypervisor to another hypervisor or from one host to another host in the network The TPM-vTPM modules, such as TPM-vTPM module 208a may be configured to connect and interact with vTPM domain service 236 to consume its services via vTPM redirector/router service 214. For example, TPM-vTPM module 208a may connect to vTPM redirector/router service 214 which may then determine the vTPM domain service to direct the connection to. In addition, vTPM redirector/router service 214 may determine whether to redirect or route the connection. TPM-vTPM module 208a may then send TPM commands to and receive responses from vTPM domain service 236 which is not local to host 202 and anchored to a clustered (RoT) that allows vTPM domain service 236 to offer zero-trust computing.

TPM-vTPM module 208a may use various methods to determine the connection information of vTPM redirector/router service 214. For example, TPM-vTPM module 208a may maintain a mapping or configuration file which includes one or more attributes that may be used to connect with vTPM redirector/router service 214, such as via an internet protocol (IP) address and/or port, the fully qualified domain name (FQDN), vTPM port, etc. TPM-vTPM module 208a may also utilize auto-discovery in determining the connection information, such as a domain name system (DNS) resolver/discovery method, multicast DNS (mDNS), DNS SRV/TXT lookup, etc. When connecting to vTPM redirector/router service 214, TPM-vTPM module 208a may provide one or more of the following information: a) host IP address or FQDN, b) a vTPM domain security identifier, or c) a vTPM security domain PKI certificate. This information may be used by vTPM redirector/router service 214 in determining the TPM domain service according to at least one policy, also referred to herein as a vTPM redirecting/routing policy.

The vTPM redirector/router service 214 may be brokered from a clustered high availability backend source(s). The vTPM redirector/router service 214 may operate over an address resolution protocol (ARP) based VIP and configured to support zero-configuration networking and domain name service (DNS)-service discovery (SD). The vTPM redirector/router service 214 may be configured as a policy-driven redirector/router service to manage the association or relationships of virtual machines and/or hypervisors with one or more vTPM domain services. In particular, vTPM redirector/router service 214 may be configured to determine which vTPM domain service to redirect or route connection requests from a TPM-vTPM module. For example, a policy may include a rule that connection requests from a TPM-vTPM module at host 202 are to be routed to vTPM domain service 236a unless a specific request to that the connection request is redirected instead.

The vTPM redirecting/routing policies may be stored in TPM domain & policy DB 234. The vTPM redirecting/routing policies may also include one or more attributes such as start date/time, end date/time, and maximum TPM nodes served per TCTI vTPM source, requesting authority identifier, identifiers of valid requesting authorities. The vTPM redirecting/routing policies may also include information regarding the association of virtual machines, hypervisors, and/or TPM-vTPM modules to vTPM domain services.

The vTPM redirector/router service 214 may operate in two modes: as a policy-driven redirection service and as a policy-driven routing service. The action as to whether to redirect or route the connection request is typically driven by the requesting agent, such as the TPM-vTPM module or the application or device that originated the request. For example, the connection request may include a request to either redirect or route said connection request. The said action may also be performed based on one or more vTPM redirecting/routing policies. With the redirect, vTPM redirector/router service 214 may transmit a response to TPM-vTPM module 208a with information such as IP address, transmission control protocol (TCP) port, or FQDN of the vTPM domain service and may specify the vTPM security domain identifier. In another example, vTPM redirector/router service 214 may also include a PKI certificate with the response. The PKI certificate may have been provided to vTPM redirector/router service 214 prior via a resource manager of the vTPM domain service.

The vTPM redirector/router service 214 may be configured to perform an attestation operation at startup and log its activities at its host or to a centralized authorized logging facility. As part of managing the vTPM domain services associations and relationships, vTPM redirector/router service 214 may be configured to automate vTPM redirection and routing, enable policy-driven vTPM access control, and vTPM security domain and/or vTPM domain service assignment of each one of virtual machines 204a-204n. In addition, vTPM redirector/router service 214 may be configured to aggregate control and/or management of multiple vTPM domain services or vTPM security domain via a centralized policy model.

Figure 4:
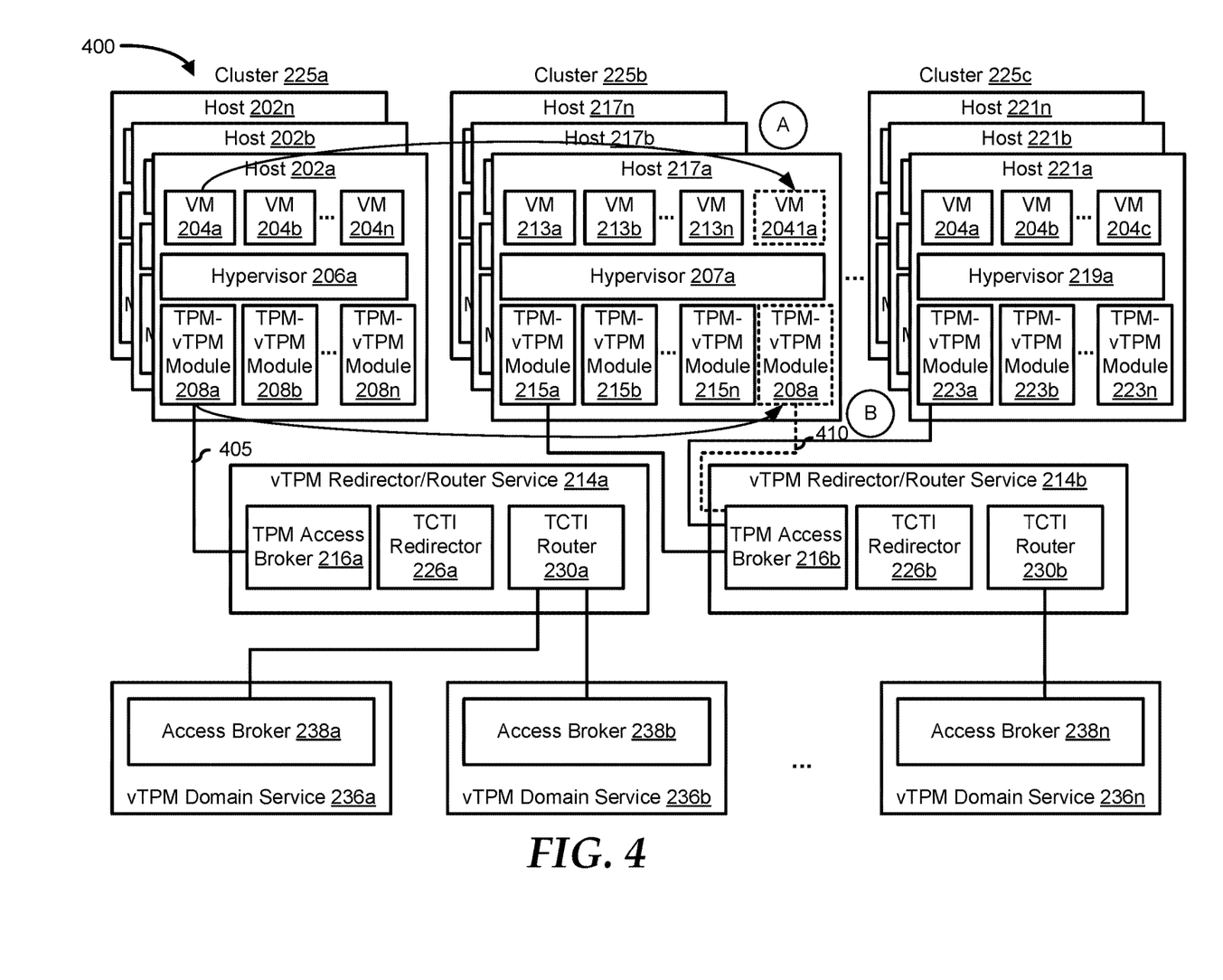
FIG. 4 is a block diagram illustrating an example system of a clustered vTPM domain service with a redirector/router service, according to an embodiment of the present disclosure.

While vTPM redirector/router service 214 may be run as a single instance, it can also be run as a distributed service which may require a quorum of more than two TPM nodes. For vTPM redirector/router service 214 to perform its functions as discussed, it may be associated with two or more vTPM domain services. Otherwise, TPM-vTPM module 208a may be configured to directly communicate with a vTPM domain service based on a configuration or mapping associated with each one of virtual machines 204a-204n. The vTPM redirector/router service 214 may also be beneficial with two or more distributed hosts or clusters of hosts as shown in FIG. 4.

The vTPM redirector/router service 214 may be configured to migrate vTPM linked virtual machines across hosts that may be in different geographic locations, wherein each vTPM is associated with a pTPM in a clustered RoT. In addition, vTPM redirector/router service 214 may be configured to allow vTPM redirecting/routing policies to be set across vTPM domain services 236a-236c. The vTPM redirecting/routing policies include one or more rules that allow a virtual machine to migrate from one hypervisor or host system to another hypervisor or host, where the vTPM redirecting/routing policies are enforced according to one or more characteristics such as IP address, network address, an identifier associated with the vTPM domain service, vTPM security domain of the virtual machine for migration. Although vTPM redirector/router service 214 may be deployed in a single instance, vTPM redirector/router service 214 may be deployed in multiple instances for high availability. For example, vTPM redirector/router service 214 may be deployed on two server nodes.

TAB 216 may be configured to handle multi-process synchronization to vTPM domain services 236a-236c. For example, TAB 216 may be able to guarantee that a process accessing a vTPM and/or TPM 258a via vTPM domain service 236a will be able to complete a TPM command without interference from other processes. TCTI 218 may be configured to handle communication to and from various components of vTPM redirector/router service 214 such as TPM-vTPM module 208a, and vTPM domain service 236a. For example, TCTI 218 may handle communication between SAPI library manager 220, TAB 216, resource manager 222, and TCTI redirector 226 or TCTI router 230. TCTI 218 may be configured to send marshaled commands to and receive marshaled responses from the TPM or the underlying software stack that ultimately interacts with the TPM.

SAPI library manager 220 may be configured to provide a registry for installed libraries. For example, SAPI library manager 220 may be used to list the installed libraries or to query a library. Resource manager 222 may be configured to keep track of TPM service connections between TPM-vTPM modules 208a-208n and the vTPM domain service it has been routed or redirected to. TPM domain policy manager 224 may be configured to initialize a new router with two or more vTPM domain services and add or remove a vTPM domain service. TPM domain policy manager 224 may also be configured to manage vTPM redirecting/routing policies based on certain criteria such as a requestor IP address, requestor network address, requestor domain name, and requested vTPM domain name. The criteria may also include a set pass-through target vTPM domain service identifier, set vTPM resource time to live limits, and set viability constraints such as tombstone expiration date and evacuation date.

TCTI redirector 226 may be configured to redirect requests/commands and/or responses from a TPM-vTPM module to a vTPM domain service based on one or more vTPM redirecting/routing policies. For example, assuming that vTPM redirector/router service 214 receives a TPM service or operation request with a redirect attribute from the TPM-vTPM module, TCTI redirector 226 may determine the information associated with the vTPM domain service that the TPM connection request should be redirected to. TCTI router 230 may be configured to route requests/commands and/or responses from a TPM-vTPM module to a vTPM domain service based on one or more vTPM redirecting/routing policies. For example, assuming that vTPM redirector/router service 214 receives a TPM service or operation request with a routing attribute from the TPM-vTPM module, TCTI router 230 may determine the information associated with the vTPM domain service that the TPM service request should be routed to. TPM-vTPM module may also include a target or preferred vTPM domain service.

The vTPM domain validator 228 may be configured to validate compliance of the TPM security domain and its components such as vTPMs and pTPMs against TCG specifications. In particular, vTPM domain validator 228 may perform domain certification and validation functions, such that it may register each clustered vTPM domain service, wherein each of the vTPM domain services has its certification authority (CA) certificate. The vTPM domain validator 228 may also be configured to validate RoT and/or certificates associated with vTPM domain services. For example, vTPM domain validator 228 may be configured to communicate with RoT validators, such as RoT validator 248*a*, and validate the provided root CA certificates associated with vTPM domain services 236*a*. The vTPM domain validator 228 may also validate PKI certificates, such as one received from the TPM-vTPM module.

The vTPM domain cluster manager 232 may be configured to register the vTPM domain services registered with vTPM redirector/router service 214. The vTPM domain cluster manager 232 may also be configured to hold communications data such as for each connection with the vTPM domain service based on one or more vTPM redirecting/routing policies. The communications data may also hold information associated with the vTPM domain service credentials for the vTPM domain service connection request so that the TPM client can obtain requested TPM functions or services. The vTPM domain cluster manager 232 may be configured to balance workload and to monitor the health of the elements of vTPM redirector/router service 214 such as the nodes, network that connect the nodes, services, etc. For example, vTPM domain cluster manager 232 may manage failover when one of the elements fails.

TPM domain and policy DB 234 may be configured to store plurality vTPM redirecting/routing policies for managing the association of virtual machines 204*a*-204*n* with vTPM domain services 236*a*-236*c* and rules regarding redirecting/routing of requests from TPM-vTPM modules. A vTPM redirecting/routing policy is a representation of at least one rule that must be satisfied to determine and connect a TPM-vTPM module of a virtual machine in a host server to a vTPM domain service, vTPM, or pTPM in a TPM security domain. TPM domain and policy DB 234 may also be configured to store data for other functions such as housekeeping of domain and routing services such as initializing a new router with two or more vTPM domain services, adding/removing vTPM domain services, and managing vTPM redirecting/routing policies based on the IP address of the virtual machine where the request originated, network address, domain name, domain identifier, hypervisor identifier, TPM-vTPM module identifier, etc.

Each of TPM security domains 254*a*-254*c* includes edge point devices or node endpoints, such as TPM nodes, gateways, etc. For example, TPM security domain 254*a* includes TPM nodes 260*a*-260*c*. The TPM security domain 254*b* includes TPM nodes 260*d*-260*f*. The TPM security domain 254*c* includes TPM nodes 260*g*-260*i*. Although it is shown that the TPM security domains include three TPM nodes, the vTPM security domains can have two TPM nodes or more than three TPM nodes which may or may not be geographically distributed. Each TPM node may include an identifier that is automatically generated, such as by a resource manager. The edge point devices may be deployed with zero-touch provisioning, zero-trust architecture, and zero-information technology (IT) handling. In addition, each TPM security domain has one or more orchestrating servers from which all TPM nodes are managed and controlled. The orchestration system is a point of management of logically grouped TPM nodes. Although each of the TPM nodes is part of a TPM security domain, it is not required to be part of a particular TPM security domain or vTPM domain service. Similarly, while it is not required that any of the TPM nodes are associated with a vTPM domain service, each TPM node or TAB can host a vTPM domain service. In this example, TPM node 260*a* or TAB 256*a*, in particular, may be configured to host vTPM domain service 236*a*. Each of the TPM nodes The TPM nodes may be used to provide a clustered RoT that is cross-certified or cross-signed by at least two TPM nodes with pTPMs. For example, TPM 258*a*-258*c* are TPM chips designed to provide hardware-based, security-related functions. In particular, TPM 258*a* may be a secure cryptoprocessor that is designed to carry out cryptographic operations. The clustered RoT may be used by vTPM domain service 236 to perform various functions such as attest services and/or devices. For example, the clustered RoT may be used to attest that TPM DB 250 and its contents have not been tampered with. This allows vTPM domain service 236 to be offered with integrity. The attestation may be based on a quorum of at least two signing TPM nodes. In addition, a cluster of two TPM nodes may be used to sustain current vTPM connections or service new vTPM connections. For example, each of the clustered TPM nodes may sign a certificate authority (CA) certificate for vTPM domain service 236. High availability may be achieved with a quorum of three or more TPM nodes. The cluster of TPM nodes can be scaled based on current requirements, such as adding or removing TPM nodes.

Each of the vTPM domain services may be hosted by one or more nodes. For example, vTPM domain service 236 may be hosted by one or more of TPM nodes 260*a*-260*c*, in TPM security domain 254. TPM security domains 254 which is a networked broadcast domain may have a minimum of two TPM nodes. In addition, TPM security domain 254 may include one or more orchestrating servers from which all TPM nodes are managed and controlled, wherein each TPM node is associated with a unique identifier. While vTPM domain service 236 may run single-instanced on a single TPM node, multiple TPM nodes may be configured to host vTPM domain service 236*a* providing high availability. The vTPM domain service 236 may be clustered and run on two or more TPM nodes within TPM security domain 254 which allows the use of a virtual IP (VIP) for load distribution.

The vTPM domain services 236*a*-236*c* may be configured to perform functions such as instantiate, maintain, and/or delete one or more vTPMs. A virtual machine may have its vTPM instance. As such, vTPM domain services 236*a*-236*c* may have a plurality of vTPM instances each of which is bound and provides TPM functionality to a virtual machine that may be in different hypervisors, and/or hosts. The vTPM domain services 236a-236c may be configured to audit each vTPM instance with respect to hypervisor host affinity and permit vTPM instances to be restricted to a particular hypervisor. The vTPM domain services 236a-236c may access the operations history of each vTPM instance. In addition, the vTPM domain services 236a-236c may as lock/unlock vTPM instances, add/remove vTPM instance usage alert triggers, and report on the history of vTPM instances and usage. The vTPM domain services 236a-236c may also be configured to perform vTPM service maintenance such as reporting system events to a central logging authority and raising alarms or alerts for various events associated with vTPM instances.

Each vTPM may be associated with a virtual machine, comport with vTPM APIs as published by the TCG, support TPM 1.x and 2.x protocols, and stored within TPM DB 250a. For example, each virtual machine that requests a TPM instance shall have its own vTPM. Configuration files associated with the virtual machine being bound to the vTPM may be maintained in TPM DB 250a. In addition, vTPM domain service 236 may instantiate child vTPMs for nested virtual machines. The vTPM domain service 236 may create a unique public key infrastructure (PKI) certificate and a globally unique identifier and associate them with the vTPM instance. The vTPM identifier may be used by TPM-vTPM module 208a to connect to the corresponding vTPM instance. The vTPM domain service may also provide the vTPM with each instance being anchored within its seal of trust that is provided by a quorum of TPM nodes 260a-260c that participate in signing and assuring the integrity of the TPM DB 250 thus forming the Root of Trust (RoT) for the clustered vTPM Domain service. As the vTPM domain service 236 may be configured to provide and manage the pTPM RoT anchor from a clustered RoT, if one of the TPM nodes fails, a quorum of the TPM nodes exists allowing the RoT to still stand.

Access brokers 238a-238c may be configured to handle access or connections to vTPM domain services 236a-236c respectively, by one or more TPM-vTPM modules simultaneously. Access brokers 238a-238c may also be configured to handle various interfaces such as TIS and CRB that may be used by the TPM-vTPM modules. TPM managers 242a-242c may be configured to manage one or more pTPMs that are clustered under vTPM domain services 236a-236c. For example, TPM managers 242a-242c may be configured to perform several functions such as initialize a new cluster and its virtual IP address, issue and maintain vTPM instances, issue and recognize vTPM PKI certificates and identifiers, add/remove a TPM node, erase a cluster and vTPM database, manage the tombstone lifetime and evacuate state connection records, and assure the viability of the vTPM RoT cluster.

RoT managers 246a-246c also referred to as RoT cluster managers, may be configured to manage RoT certificates associated with each of TPMs 258a-258i. For example, RoT managers 246a-246c may respond to requests for RoT certificates. In addition, RoT managers 246a-246c may be configured to register TABs 256a-256i each of which handles multi-process synchronization to TPMs 258a-258i respectively. RoT manages 246a-246c and may also be configured to maintain a quorum for the RoT. When the quorum fails, RoT managers 246a-246c may issue an alarm or alert that the integrity of a vTPM domain service, such as one of vTPM domain services 236a-236c is compromised. If the quorum is compromised, then the clustered RoT may not instantiate a new vTPM. The quorum should then be restored to a quorum status manually.

RoT validators 248a-248c may be configured to validate or verify the authenticity of RoT certificates which may be cross-signed by each of the TPM nodes. For example, RoT validators 248a-248c may verify that the CA certificate associated with the RoT TPM TAB is valid and has not been tampered with. If the CA certificate is about to expire within a certain threshold, then RoT managers 246a-246c may notify the TPM node that hosts the RoT TPM TAB so that its CA certificate can be refreshed before it expires. The threshold may be a default threshold or set by an administrator. For example, the threshold may be a day or week before the expiration of the CA certificate. RoT certification managers 265a may be configured to create and store copies of the RoT CA certificates in TPM databases 250a-250c. In addition, RoT certification managers 265a-265c may be responsible for the lifecycle management of the RoT CA certificates and for initiating and completing CA certificate refreshes. RoT certification managers 265a-265c may also be responsible for the eviction of expired RoT CA certificates when they are no longer in use, such as when the expired RoT CA certificates have been tomb-stoned long enough so that the eviction will not cause operational issues.

Resource managers 244a-244c may be configured to manage TPM nodes 260a-260i and TPMs 258a-258i. TPM DBs 250a-250c may be configured to store information associated with vTPM domain services 236a-236c and its components respectively. For example, TPM DB 250a may store concurrent sessions maintained by TPMs 258a-258c which may be used to validate whether a reloaded session context is the most recent version. In addition, TPM DBs 250a-250c may store one or more files and/or configurations associated with vTPM instances. VIP services 252a-252c may be configured to maintain and distribute a VIP address across registered TPM nodes via address resolution protocol (ARP) or other means. While TCTI 240a may be configured to handle communication to and from the lower layers of the TPM software stack (TSS) software stack.

FIG. 4 illustrates a system 400 for clustered vTPM domain services with redirector/router services. System 400 includes clusters 225a-225c, vTPM redirector/router services 214a and 214b, and vTPM domain services 236a-236n. Cluster 225a includes hosts 202a-202n, cluster 225b includes hosts 217a-217n, and cluster 225c includes host 221a-22n. Each of the hosts is similar to host 202 of FIG. 2 and is configured to host virtual machines. For example, host 202a includes virtual machine 204a-204n, a hypervisor 206a, and TPM-vTPM modules 208a-208n. Host 217a includes virtual machines 213a-213n, a hypervisor 207a, and TPM-vTPM modules 215a-215n. Host 221a includes virtual machines 204a-204c, a hypervisor 219a, and TPM-vTPM modules 223a-223n. Each of the virtual machines is similar to virtual machine 204 of FIG. 2. Similarly, each of the hypervisors is similar to hypervisor 206, and each of the TPM-vTPM modules is similar to TPM-vTPM module 208 of FIG. 2. Similar to TPM-vTPM module 208a, each of the other TPM-vTPM modules may interact with vTPM domain services 236a-236c via vTPM redirector/router services 214a and 214b.

The vTPM redirector/router services 214a and 214b include access brokers 216a-216b, TCTI redirectors 226a-226b, and TCTI routers 230a-230b. The vTPM domain services 236a-236n include access broker 238a-238n. Each of these components can be implemented with hardware and/or software. The components shown are not drawn to scale and system 400 may include additional or fewer components. For example, there may be additional hosts and vTPM domain services. In addition, connections between components may be omitted for descriptive clarity. Shown here are two vTPM redirector/router services to provide high availability, such that if one of the vTPM redirector/router services fails, the remaining vTPM redirector/router service can assume the functions of the failed vTPM redirector/router service.

FIG. 4 is annotated with letters A and B. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, virtual machine 204a is migrated from hypervisor 206a to hypervisor 207a. As part of the migration of virtual machine 204a, TPM-vTPM module 208a is also migrated. During the migration, configuration information associated with virtual machine 204a and TPM-vTPM module 208a may be copied over to hypervisor 207a. In addition, memory space associated with virtual machine 204a and TPM-vTPM module 208a is synchronized with hypervisor 207n.

At stage B, a new connection 410 to TPM access broker 216b is created by TPM-vTPM module 208a and a previous connection 405 is closed. Because the domain security identifier and the virtual machine identifier are the same, TPM-vTPM 208a may connect to the same vTPM instance stored in TPM DB 250a of vTPM domain service 236a. The domain security identifier may have been issued by vTPM domain service 236a and associated with virtual machine 204a during the instantiation of the vTPM instance which would have occurred while virtual machine 204a was residing at hypervisor 206a before migrating to hypervisor 207a. The virtual machine identifier may have been associated with virtual machine 204a when it was provisioned at hypervisor 206a. Because the pTPM RoT anchoring system for each vTPM instance is remote and the configuration file or the vTPM instance file is also maintained remotely, the virtual machine that is TPM enabled may be migrated between hypervisors and hosts.

Those of ordinary skill in the art will appreciate that the configuration, hardware, and/or software components of systems depicted above may vary. For example, the illustrative components are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In addition, the functions and features of components such as virtual machines, hypervisors, databases, and TPMs are known in the art and will not be further disclosed herein, except as needed to illustrate the various embodiments disclosed herein. In the discussion of the figures, reference may also be made to components illustrated in other figures for continuity of the description. Although discussions of component functionality may be represented by a single component, the functions of these types of components are similar. For example, the functionality of TPM-vTPM module 208a is similar to TPM-vTPM module 215a.

Figure 5:
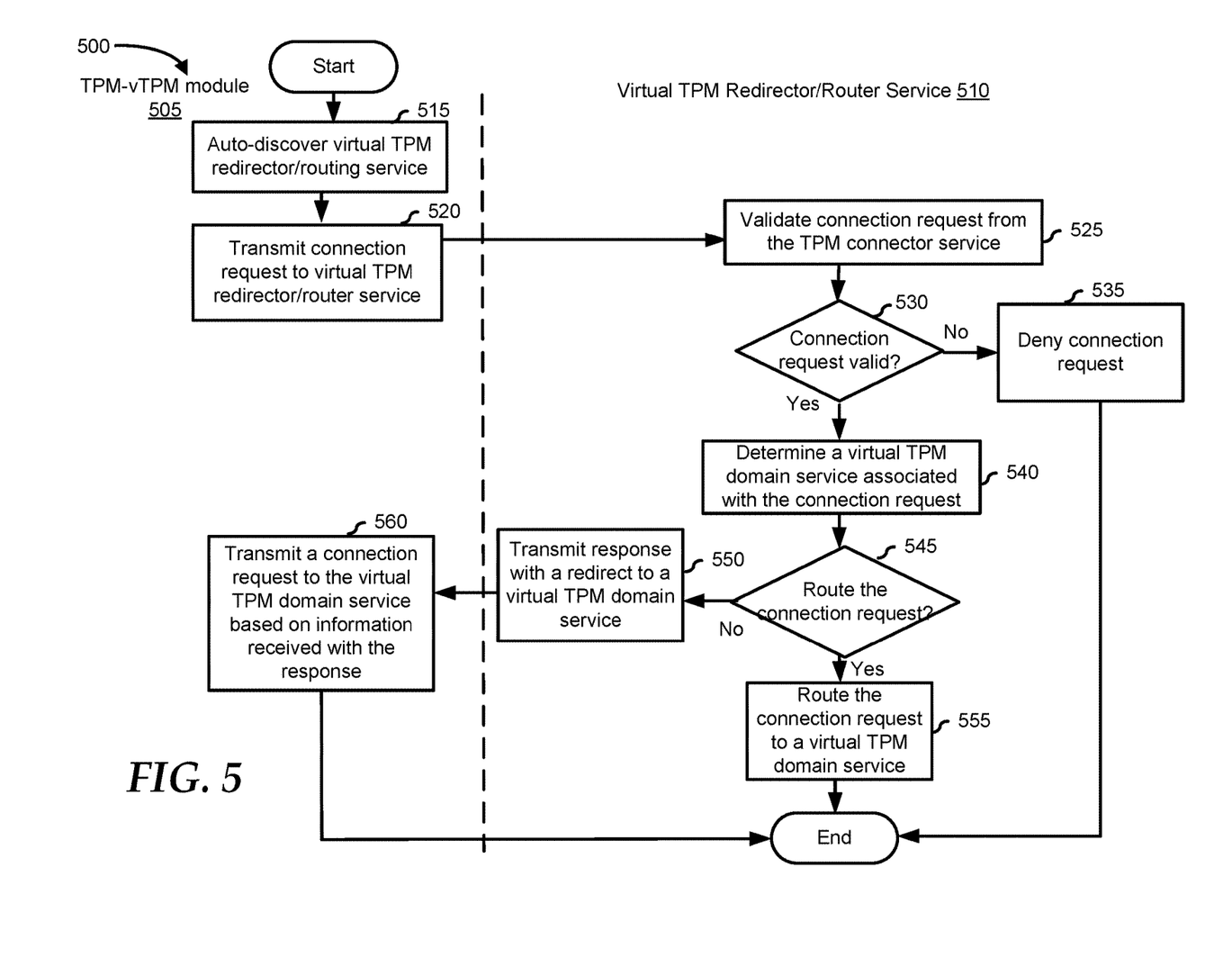
FIG. 5 is a flowchart illustrating an example of a method associated with a clustered vTPM domain service system with a redirector/router service, according to an embodiment of the present disclosure.

FIG. 5 illustrates a method 500 associated with the interaction of a TPM-vTPM module with a clustered vTPM domain service via a redirector/router service system. Method 500 may be performed by a TPM-vTPM module 505 and a vTPM redirector/router service 510 which are similar to TPM-vTPM module 208a and vTPM redirector/router service 214 respectively of FIG. 2 and FIG. 3. TPM-vTPM module 505 and a vTPM redirector/router service 510 are also similar to TPM-vTPM modules and vTPM redirector/router services 214a-214b of FIG. 4. However, while embodiments of the present disclosure are described in FIGS. 2-4, it should be recognized that other systems may be utilized to perform the described method. One of skill in the art will appreciate that this flowchart explains a typical example, which can be extended to advanced applications or services in practice.

With method 500, TPM-vTPM module 505 communicates with vTPM redirector/router service 510 for a TPM transaction such as a TPM command or operation, which vTPM redirector/router service 510 then redirects or routes the connection request to a vTPM domain service. At this point, TPM-vTPM module 505 and vTPM redirector/router service 510 may be in an environment with a plurality of host systems and/or vTPM domain services such as in a relatively large enterprise or corporation, wherein each department of the enterprise or corporation may have its on vTPM domain service.

Method 500 typically starts at block 515 where TPM-vTPM module 505 determines connection information associated with a vTPM redirector/router service, such as vTPM redirector/router service 510. The determination may be performed using auto-discovery via zero-configuration networking, mDNS, DNS-SD, or similar. In another example, the determination may be based on configuration information maintained by TPM-vTPM module 505 or its associated hypervisor/host. Before block 515, a virtual machine, an application, a device, a service, etc. may have issued a request for a TPM operation. For example, the virtual machine may request to get information about the endorsement key and certificates which is then transmitted to the hypervisor and then to the TPM-vTPM module 505, which then determines where to transmit the connection request.

The connection information may include the IP address, and/or the FQDN of vTPM redirector/router service 510 or its host. The connection information may also include the transmission control protocol (TCP) port and/or a PKI or an X.509 certificate associated with one of TPM-vTPM module 505, the virtual machine, hypervisor, or the host. The certificate may have been retrieved by an administrator using a resource manager of the vTPM domain service before a request for a TPM operation. The determination may be performed via configuration files or by using auto-discovery. The connection information may also include the vTPM instance, vTPM domain service, or the TPM security domain identifier and virtual machine identifier. In another example, the connection information may also include the identifier of the target vTPM domain service or the TPM security domain. In yet another example, TPM-vTPM module 505 may include a PKI certificate associated with the vTPM domain service or the TPM security domain service.

At block 520, TPM-vTPM module 505 initiates a connection request to vTPM redirector/router service 510 based on the connection information. The connection request may include a request for a TPM transaction. As such, the connection request may include a payload associated with the TPM transaction. At block 525, vTPM redirector/router service 510 may validate the connection request from the TPM-vTPM module. For example, vTPM redirector/router service 510 may validate the authenticity and authority of TPM-vTPM module 505. For example, vTPM redirector/ router service 510 may validate the PKI certificate associated with the connection request.

The method proceeds to decision block 530 where the method determines whether the connection request is valid. If the connection request is valid, then the "YES" branch is taken and the method proceeds to block 540. If the connection request is not valid, then the "NO" branch is taken and the method proceeds to block 535 where the method denies the connection request and the method ends. At block 540, the method may determine the vTPM domain service associated with the connection request. In particular, the method may determine the vTPM domain service, vTPM, and/or pTPM associated with TPM-vTPM module 505.

At decision block 545, the method determines whether the connection request is to be redirected or routed to the vTPM domain service. The method may determine whether to redirect or reroute the request based on one or more policies, which may be the same or different than the policies in block 530. In another example, the connection request may include a redirect or a reroute request. If the connection request is to be rerouted, then the "YES" branch is taken and the method proceeds to block 555. If the connection request is to be redirected, that is not routed, then the "NO" branch is taken and the method proceeds to block 550. At block 550, the method transmits a response to TPM-vTPM module 505. The response may include redirect information of the vTPM domain service. The redirect information may include an internet protocol address or the FQDN of the vTPM domain service. The redirect information may also specify a destination TCP port and the security identifier of the vTPM domain service. In another embodiment, the redirect information may include a PKI certificate. The PKI certificate may have been retrieved by an administrator using a resource manager of the vTPM redirector/router service and/or vTPM domain service before a request for a TPM operation. At block 560, the method transmits a connection request to the vTPM domain service based on the redirect information received with the response from vTPM redirector/router service 510.

At block 555, vTPM redirector/router service 510 routes the connection request to the vTPM domain service. For example, vTPM redirector/router service 510 may forward the connection request to the vTPM domain service. The forwarded connection request may include information associated with the origin of the request such as the IP address or FQDN of the TPM-vTPM module and/or hypervisor or host. In another embodiment, vTPM redirector/router service 510 may transmit a connection request to the vTPM domain service using the security identifier of the vTPM domain service or the vTPM instance. In addition, the connection request may include the virtual machine identifier associated with TPM-vTPM module 505 along with the payload if any. In yet another embodiment, vTPM redirector/router service 510 may provide a PKI certificate to the vTPM domain service with the request.

Although FIG. 5 show example blocks of method 500 in some implementations, method 500 may include additional blocks, fewer blocks, different blocks, or differently arranged blocks than those depicted in FIG. 5. Those skilled in the art will understand that the principles presented herein may be implemented in any suitably arranged processing system. Additionally, or alternatively, two or more of the blocks of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
 a processor; and a memory device storing instructions that when executed cause the processor to perform operations including:

validating a connection request received from a trusted platform module (TPM)-virtual TPM (vTPM) module according to a first policy, wherein the connection request originated from a remote virtual machine associated with the TPM-vTPM module, wherein the connection request includes a root of trust certificate associated with a physical TPM (pTPM) that is further associated with a vTPM domain service, and wherein the connection request includes a request for a TPM transaction to be processed by the pTPM via the vTPM domain service;

wherein the root of trust certificate is cross-signed by at least two information handling systems, wherein each one of the information handling systems includes a particular pTPM, in response to determining that the connection request and the root of trust certificate are valid based on the first policy, determining the vTPM domain service associated with the remote virtual machine, wherein the vTPM domain service is hosted by another information handling system with the pTPM;

determining, based on a second policy, whether the connection request is to be routed or redirected to the vTPM domain service hosted by the other information handling system; and in response to determining based on the second policy that the connection request is to be redirected to the vTPM domain service, transmitting a response to the TPM-vTPM module, wherein the response includes redirect information to the vTPM domain service.

2. The information handling system of claim 1, in response to determining based on the second policy that the connection request is to be routed to the vTPM domain service, routing the connection request to the vTPM domain service.

3. The information handling system of claim 1, wherein the operations are performed by a vTPM router service that is configured to operate over an address resolution protocol based virtual internet protocol.

4. The information handling system of claim 3, wherein the vTPM router service is configured to automate vTPM redirection.

5. The information handling system of claim 3, wherein the vTPM router service is configured to automate vTPM routing.

6. The information handling system of claim 3, wherein the vTPM router service is further configured to control a plurality of vTPM domain services.

7. The information handling system of claim 3, wherein the vTPM router service is further configured to migrate the remote virtual machine from one vTPM domain service of the vTPM domain services to a second vTPM domain service of the vTPM domain services.

8. The information handling system of claim 3, wherein the vTPM router service is further configured for vTPM domain service assignment of the remote virtual machine.

9. The information handling system of claim 1, wherein the first policy includes information associated with identifiers of valid requesting authorities.

10. A method comprising:

validating, by a processor, a connection request received from a trusted platform module (TPM)-virtual TPM (vTPM) module according to a policy, wherein the connection request originated from a remote virtual machine associated with the TPM-vTPM) module, wherein the connection request includes a root of trust certificate associated with a physical TPM (pTPM) that is further associated with a vTPM domain service, and wherein the connection request includes a request for a TPM transaction for the pTPM via the vTPM domain service;

wherein the root of trust certificate is cross-signed by at least two information handling systems, wherein each one of the information handling systems includes a particular pTPM, in response to determining that the connection request and the root of trust certificate are valid based on the policy, determining the vTPM domain service associated with the remote virtual machine, wherein the vTPM domain service is hosted by another information handling system with the pTPM;

determining whether the connection request is to be routed or redirected to the vTPM domain service that is hosted by the other information handling system;

in response to determining that the connection request is to be redirected, transmitting a response to the TPM-vTPM module, wherein the response includes redirect information to the vTPM domain service;

and in response to determining that the connection request is to be routed, routing the connection request to the vTPM domain service.

11. The method of claim 10, wherein the policy includes information associated with identifiers of valid requesting authorities.

12. The method of claim 10, wherein the redirect information includes connection information of the vTPM domain service.

13. The method of claim 10, wherein the redirect information includes a fully qualified domain name of the vTPM domain service.

14. The method of claim 10, wherein the policy includes information regarding association of the remote virtual machine to the vTPM domain service.

15. A method comprising:

migrating, by a processor, a virtual machine associated with a first hypervisor that is hosted by a first information handling system to a second hypervisor hosted by a second information handling system;

migrating a trusted platform module (TPM)-virtual TPM (vTPM) module associated with the virtual machine of the first hypervisor that is hosted by the first information handling system to the second hypervisor hosted by the second information handling system; and validating a connection request received from a trusted platform module (TPM)-virtual TPM (vTPM) module according to a first policy, wherein the connection request originated from a remote virtual machine associated with the TPM-vTPM module, wherein the connection request includes a root of trust certificate associated with a physical TPM (pTPM) that is further associated with a vTPM domain service, and wherein the connection request includes a request for a TPM transaction to be processed by the pTPM via the vTPM domain service;

wherein the root of trust certificate is cross-signed by at least two information handling systems, wherein each one of the information handling systems includes a particular pTPM; and subsequent to the migrating of the TPM-vTPM module, creating a connection between the TPM-vTPM module and service configured to route or redirect a request from the TPM-vTPM module and removing a previous connection between the TPM-vTPM module and the service.

16. The method of claim 15, wherein configuration information associated with the virtual machine is copied from the first hypervisor to the second hypervisor.

17. The method of claim 15, wherein the connection is based on a vTPM instance used in the previous connection.

18. The method of claim 17, wherein the vTPM instance is maintained at a remote server.

19. The method of claim 15, wherein the virtual machine is associated with an identifier when provisioned at the first hypervisor.

* * * * *